United States Patent

Schliemann et al.

[11] Patent Number: 6,109,467
[45] Date of Patent: Aug. 29, 2000

[54] CLOSURE CAP FOR AN OPERATING FLUID CONTAINER

[75] Inventors: Harald Schliemann, Waiblingen; Hans Nickel, Cottenweiler; Michael März, Leutenbach; Savino Petruzzelli, Marbach; Matthias Fleischer, Rudersberg; Siegfried Wilhelm, Kernen, all of Germany

[73] Assignee: Andreas Stihl AG & Co., Germany

[21] Appl. No.: 08/924,291

[22] Filed: Sep. 5, 1997

[30] Foreign Application Priority Data

Sep. 6, 1996 [DE] Germany .................. 296 15 509 U

[51] Int. Cl.[7] .............................. B65D 41/04; B65D 51/16
[52] U.S. Cl. .................. 215/330; 220/86.1; 220/231; 220/290; 220/303; 220/360; 220/366.1
[58] Field of Search ........................... 215/329, 330; 220/86.1, 302, 345.3, 203.05, 203.06, 203.29, 231, 288, 290, 303, 89.1, 86.2, 360, 366.1

[56] References Cited

U.S. PATENT DOCUMENTS

| | | | |
|---|---|---|---|
| 2,609,117 | 9/1952 | Miller ........................................ | 220/302 |
| 2,895,637 | 7/1959 | Bakke et al. ............................. | 220/302 |
| 4,953,728 | 9/1990 | Meek ....................................... | 215/330 X |
| 5,443,175 | 8/1995 | Kelly et al. .............................. | 220/231 |
| 5,529,201 | 6/1996 | Tallent et al. ........................... | 220/302 X |
| 5,680,954 | 10/1997 | Arnold et al. ........................... | 215/330 X |

FOREIGN PATENT DOCUMENTS 4435165   4/1996   Germany .

*Primary Examiner*—Allan N. Shoap
*Assistant Examiner*—Niki M. Eloshway
*Attorney, Agent, or Firm*—Robert W. Becker & Associates

[57] ABSTRACT

A closure arrangement of a container has fill socket with an inner thread and a closure cap with a cylindrical base body having an outer thread matching the inner thread of the fill socket of the container. The cylindrical base body has an annular flange adjacent to the outer thread. An annular seal, connected to one side of the annular flange facing the outer thread, is provided for sealingly resting on the rim of the fill socket when the closure cap is threaded into the fill socket. The outer thread has a resilient tongue extending in the circumferential direction of the cylindrical body and has a radial projection cooperating with the abutment of the matching inner thread. The radial projection, when the closure cap is threaded into the fill socket, catches in a catch position behind the abutment before a fully closed position of the closure cap in the fill socket is reached.

16 Claims, 5 Drawing Sheets

CLOSURE CAP FOR AN OPERATING FLUID CONTAINER

BACKGROUND OF THE INVENTION

The present invention relates to a closure cap for the filling opening of a container, especially of a container containing operating fluids of a hand-held working tool driven by a combustion engine such as a motor chainsaw, a cutter, a trimmer etc., whereby the closure cap comprises a cylindrical base body with an outer thread that matches an inner thread of a filling opening. The base body is provided at one axial end with an angular flange having a seal whereby the angular flange and the seal engage the end face of the fill opening.

In hand-held working tools driven by a combustion engine the housing of the working tool includes containers for operating fluids. For example, in a motor chainsaw an oil container is provided from which the oil for lubricating the chainsaw is supplied into the guide groove of the guide rail. Furthermore, a fuel container for the combustion engine, in most cases a two-stroke engine, is provided. These operating fluids (oil, fuel, lubricant) of the working tool are provided in a container with fill openings which are to be closed by a closure cap in a fluid-tight manner. When the seal contained within the closure cap is undamaged and the closure cap is properly positioned and tightened with the required torque, a tight closure of the fill opening of the container over an extended service life is ensured.

Because of manufacturing considerations the thread of the fill opening is, in general, very short so that depending on the embodiment of the thread at the closure cap an improper threading of the closure cap into the fill opening may occur. Furthermore, because of the short thread a quick loosening of the closure cap must be avoided because excess inner pressure within the container may force the closure cap away from the opening during removal and the liquid contained within the container may spray. This is to be avoided in order to protect the operator as well as the environment.

It is therefore an object of the present invention to provide a closure cap for the operating fluid containers of a hand-held working tool provided with a combustion engine with which a safe tightening of the closure cap can be ensured and the removal of the closure cap under excess internal pressure can be avoided.

SUMMARY OF THE INVENTION

The closure arrangement of a container according to the present invention is primarily characterized by: a closure cap having a cylindrical base body;
 the cylindrical base body having an outer thread;
 the cylindrical base body comprising an annular flange adjacent to the outer thread;
 an annular seal, connected to a first side of the annular flange facing the outer thread;
 a fill socket comprising an inner thread matching the outer thread;
 one of the outer thread and the inner thread comprising a resilient tongue extending in the longitudinal direction of the inner or outer thread and having a radial projection;
 the fill socket having a rim, wherein the seal sealingly rests on the rim when the closure cap is threaded into the fill socket and positioned in the fully closed position;
 the other one of the inner thread and the outer thread having an abutment, wherein the radial projection, when the closure cap is threaded into the fill socket, catches in a catch position behind the abutment before the fully closed position is reached.

The tongue is preferably positioned at a slant angle matching the pitch angle of the outer thread.

The tongue and the radial projection are arranged within the path of the outer thread.

The abutment is preferably formed by a free end of the inner thread.

The inner thread may consist of a single thread turn extending over a circumferential angle of 340 to 350°.

The tongue preferably has a fixed end connected to the cylindrical body and a free end, wherein the radial projection is connected to the free end.

The tongue has preferably an angular length of 50° to 75° in the circumferential direction.

The base body is preferably comprised of plastic material.

The tongue with a radial projection may be integrally formed together with the base body.

It is also possible to provide the tongue with a radial projection as a separate component inserted into the base body, preferably in the form of a metal bracket clamped within the base body.

The radial projection may be convexly shaped.

The projection has preferably the shape of a triangular prism or a trapezoidal prism.

The fixed end of the tongue is preferably located in a leading position in the closing direction of the closure cap.

The catch position and the fully closed position are spaced apart by an angular distance of 120° or less, preferably by an angular distance of 10° to 30°.

The decisive advantage of the present invention is that first the seal at the end face of the fill socket is effortlessly lifted off the rim of the fill socket and then a greater torque must be applied in the removal direction. The removal of the closure cap in any case can take place only after the excess interior pressure of the container has been released. The thread is embodied over a complete (360°) thread turn so that threading is only possible when the closure cap is positioned straight on the fill socket, i.e., is properly aligned and not slanted relative to the fill socket.

According to a preferred embodiment of the invention, the tongue is positioned at an angle to the annular flange. This angle corresponds to the pitch angle of the thread. In this manner, the tongue is positioned completely within the path or extension of the thread so that the neighboring thread turns are not interrupted.

Preferably, the tongue and the radial projection are arranged within the thread path of the outer thread of the closure cap so that the projection cooperates with an abutment provided at the container. Of course, the reverse arrangement is also possible, i.e., the tongue is provided at the inner thread and the abutment is provided at the outer thread of the cap. Preferably, the abutment is the free end of the inner thread. Because of manufacturing-technological reasons, the inner thread is a single thread turn extending over a circumferential angle of 340° to 350°.

Preferably, the tongue is attached with one end and the free end is provided with the radially outwardly projecting projection. Alternatively, the tongue may also be attached at both ends whereby the maximum radial deflection of the tongue occurs approximately at the center point of its total length. At the center point of the total length of the tongue the projection is arranged. In a preferred embodiment of a tongue with a free end, the angular distance of its length is approximately 50° to 70°.

Preferably, the base body is comprised of a plastic material, especially POM. This plastic material is very suitable because of properties in regard to stiffness, fuel resistance, simple manufacturing, and low weight and is therefore especially suitable for closure caps. The tongue and the projection are preferably embodied as an integral part of the base body. However, it is also possible to provide the tongue and the projection as a separate component to be inserted into the base body. The latter design is especially used when for the tongue and the projection a different material is to be used than for the closure cap, for example when the tongue is to be embodied as a springy metal bracket to be clamped within the base body. The projection may then be in the form of a convex curved portion.

When the tongue and the projection are integrally formed with the base body, the projection preferably has the shape of a triangular prism. The two slanted surfaces of the prism are arranged in the threading and removal directions. In order to make apparent the two functional positions of the closure cap, i.e., threading, respectively, removal of the closure cap versus tight sealing action, respectively, pressure release of the seal, apparent to the operator, it is suggested that a sufficiently large rotational angle is provided between the catch position and the fully closed position of the closure cap. This angle is maximally 120°, preferably 10° to 30°.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1–8.

Figure 1:
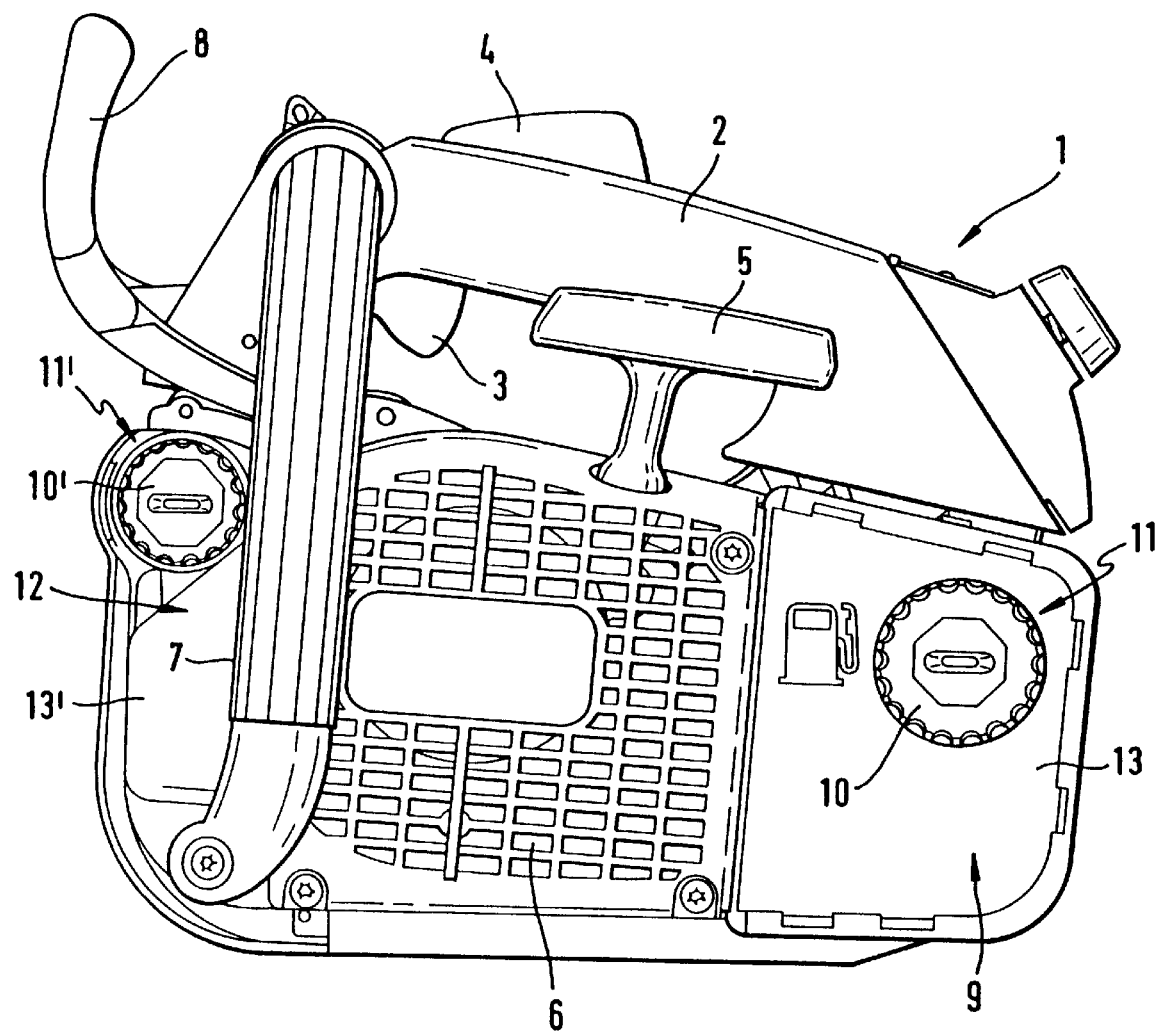
FIG. 1 is a side view of a hand-held working tool.

The portable, hand-held working tool 1 represented in FIG. 1 is motor chainsaw with an upper grip 2 extending in the longitudinal direction of the housing. A throttle lever 3 is provided at the grip 2 at a side facing the housing and the opposite side of the grip 2 is provided with a throttle lever lock 4. The combustion engine contained within the housing of the motor chainsaw can be started by a starter cable 5 which is integrated into the lateral fan cover 6 of the housing of the working tool 1. At the end of the housing facing the saw chain, a grip bracket 7 is provided which extends from the forward end of the grip 2 to the bottom of the working tool 1. The grip 7 is positioned at a spacing to the housing of the working tool 1.

The grip bracket 7 and the grip 2 have positioned in front thereof a protective bracket 8 which is provided with a non-represented safety braking device for instant shutdown of the saw chain circulating on the guide rail. The operation of the motor chainsaw 1 requires operating fluids. In the area of the forward grip bracket 7 within the housing of the working tool 1 an oil container 9 is provided having a fill opening 11 that is closed by a closure cap 10. In the same manner, the housing of the working tool 1 in the area of the rearward end of the grip 2 is also provided with a fuel tank 12 which is also closed by a closure cap 10' that closes off the fill opening 11. The respective container wall is indicated with reference numerals 13 and 13'.

Figure 2:
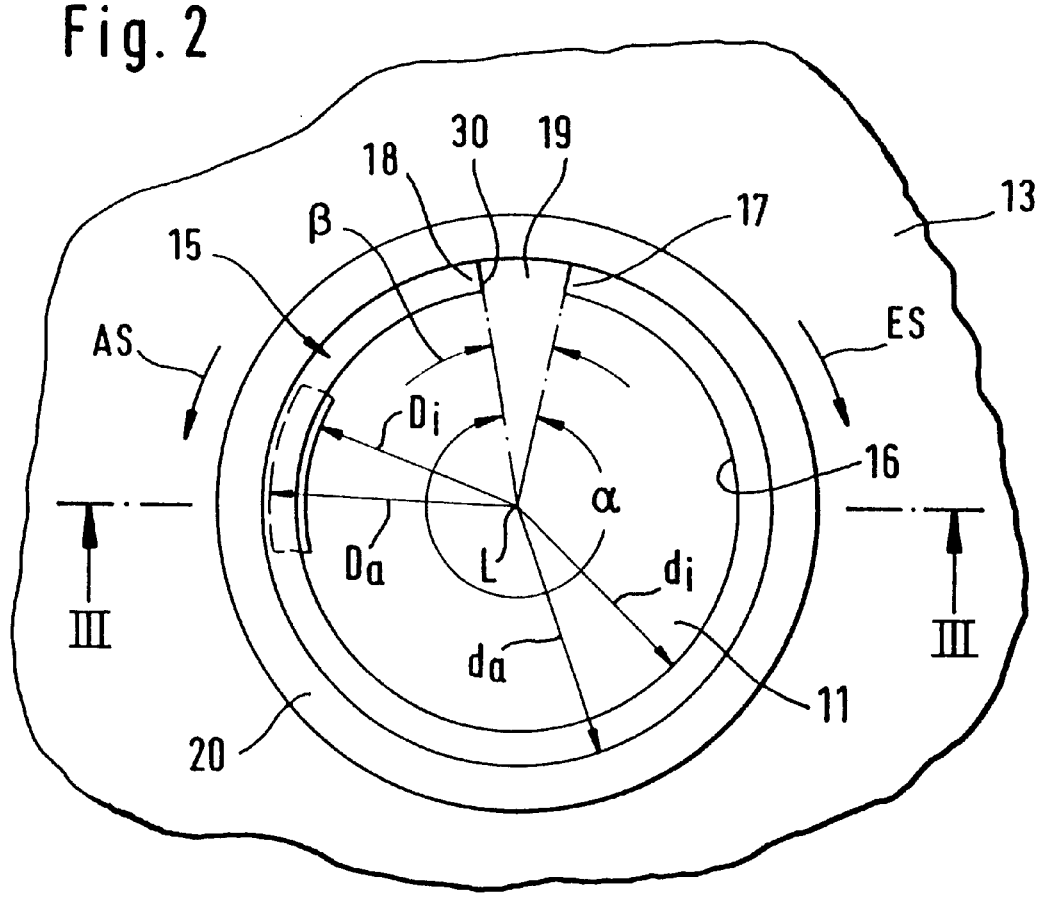
FIG. 2 is an enlarged representation of a plan view of the fill socket of a container.
Figure 3:
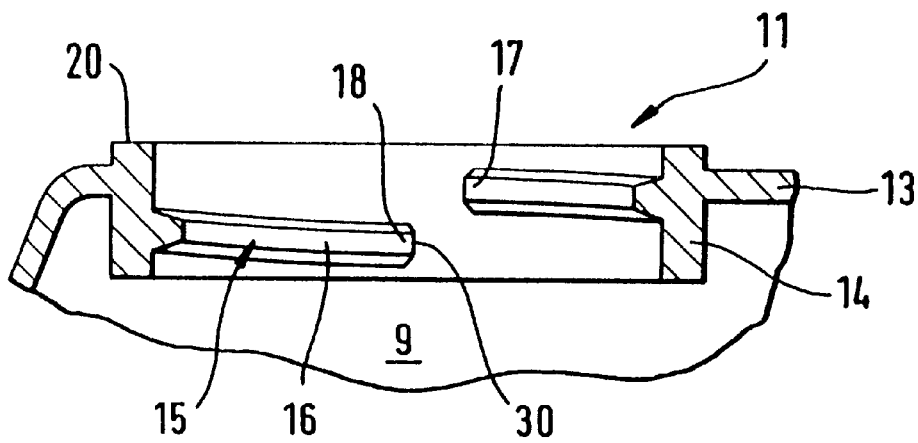
FIG. 3 shows a section along the line III—III of FIG. 2.

According to the representation in FIGS. 2 and 3, the fill opening 11 is embodied in the form of a fill socket 14 within the wall 13 of the containers 9 or 12. In the fill opening 11, respectively, at the inner side of the fill socket 14 an inner thread 15 is provided which has a relatively steep pitch angle and is comprised of a single thread turn 16 which extends over an angular distance of less than 360°. Expediently, it is also possible to provide a plurality of axially congruent thread turns.

As is shown in FIG. 2, the thread turn 16 extends over a circumferential angle $\alpha$ of approximately 340° to 350°. Between the two ends 17 and 18 in the circumferential or longitudinal direction of the thread turn 16 a gap 19 is provided that extends over a circumferential angle $\beta$ of approximately 10° to 20°.

Figure 6:
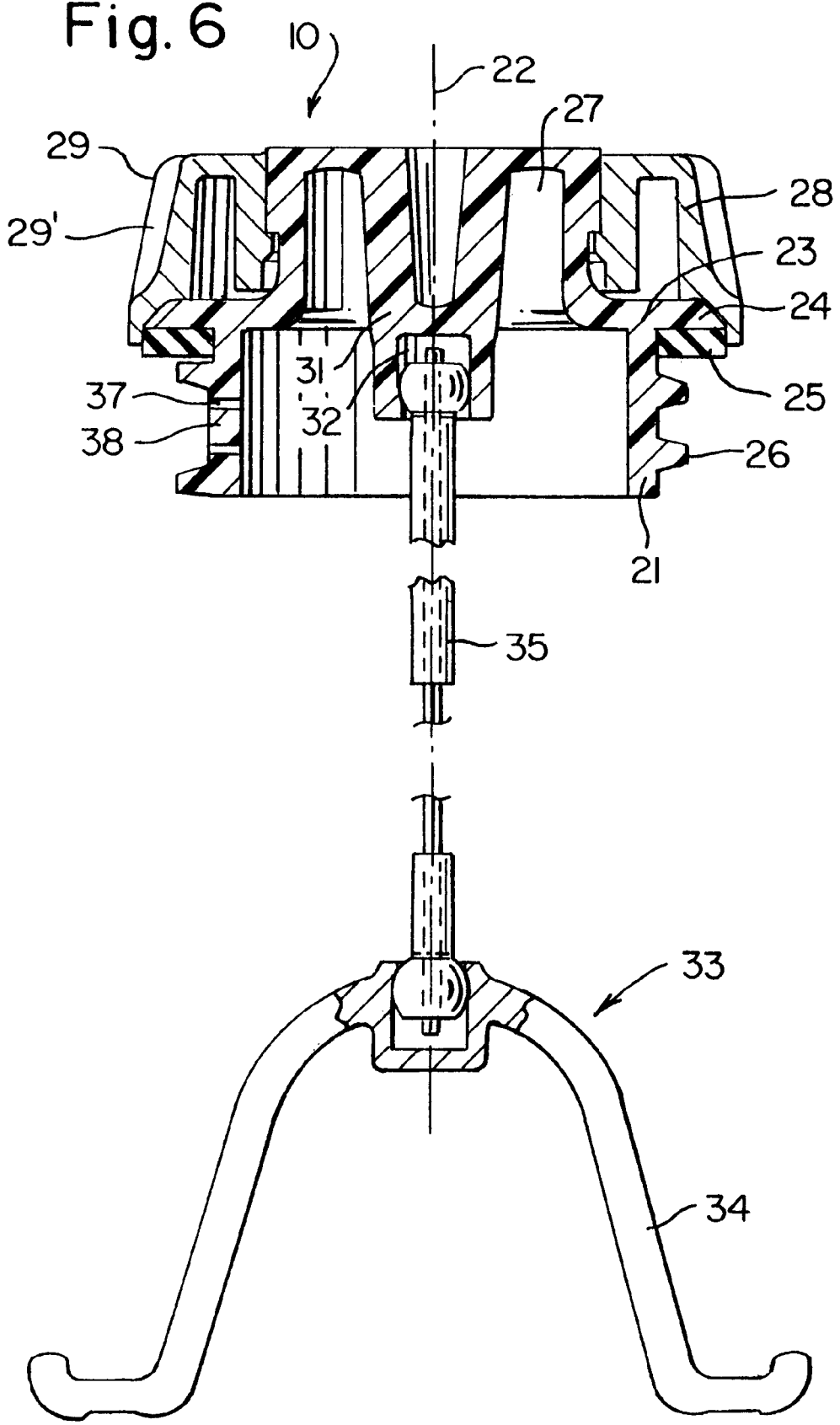
FIG. 6 is an axial section of the closure cap with securing bracket connected thereto.

The inner end 18 of the thread turn 16 provides an abutment 30 for a projection of the closure cap 10 which will be described in the following in connection with FIGS. 4 and 6. The fill socket 14 has a rim 20 formed at the exterior of the container 9 which serves for receiving a seal to be described in the following. The fill opening 11 has a central longitudinal axis L.

The fill opening 11, shown in FIGS. 2 and 3, is closed by a threaded closure cap 10. The closure cap and the fill socket form the closure arrangement for the respective containers. Such a closure cap 10 is shown in FIG. 6 in section and is comprised of a base body 21 which is of radial symmetry relative to the longitudinal center axis 22.

In the shown embodiment the base body 21 is a cylindrical tube section which at one axial end 23 has an annular flange 24 which covers the rim 20 of the fill socket of the fill opening 11 in FIG. 3. The annular flange 24 carries a seal 25 in order to ensure a liquid-tight closure of the container 9 or 12. The cylindrical base body 21 comprises an outer thread 26 which cooperates with the inner thread 15 of the fill opening 11, respectively, the fill socket 14.

Projecting from the axial end 23 is a cup-shaped center piece 27 on which is positioned an annular grip portion 28 that has an outer diameter corresponding to the outer diameter of the annular flange 24 and which is provided at its metal surface 29 with a fluting 29' in order to improve secure gripping. The center portion 27 comprises a centrally inwardly projecting dome 31. Its free end has a snap-on receiving opening 32 for a closure cap securing device 33. It is comprised of a securing bracket 34 which engages behind the inner edge of the fill socket 14 and is connected with a cable 35 to the closure cap 10. The cable ends are in the shape of spherical snap-on bodies so that they can be snapped securely into the respective receiving openings at the securing bracket 34 and the dome 31.

Figure 4:
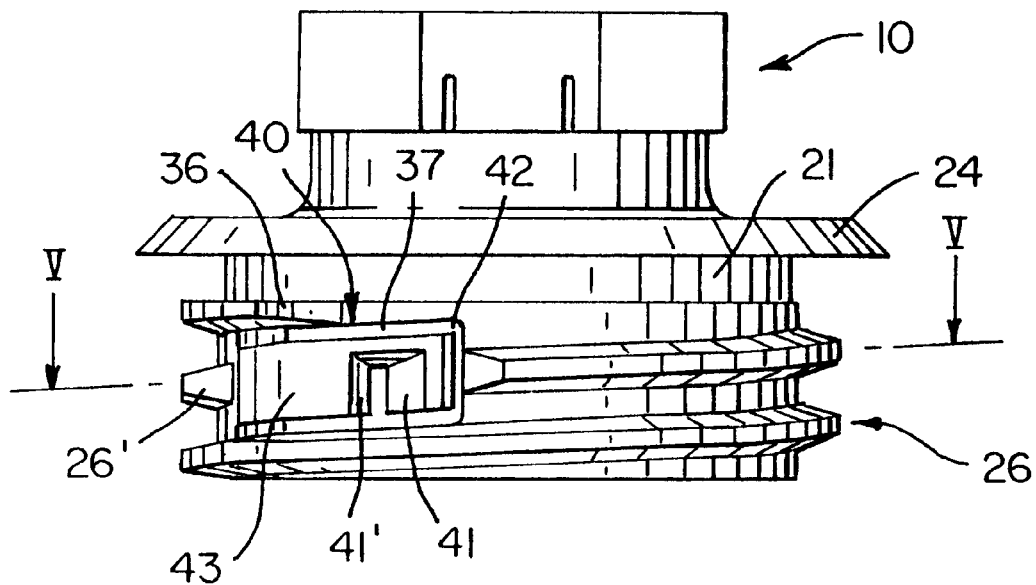
FIG. 4 is a side view of the closure cap.
Figure 5:
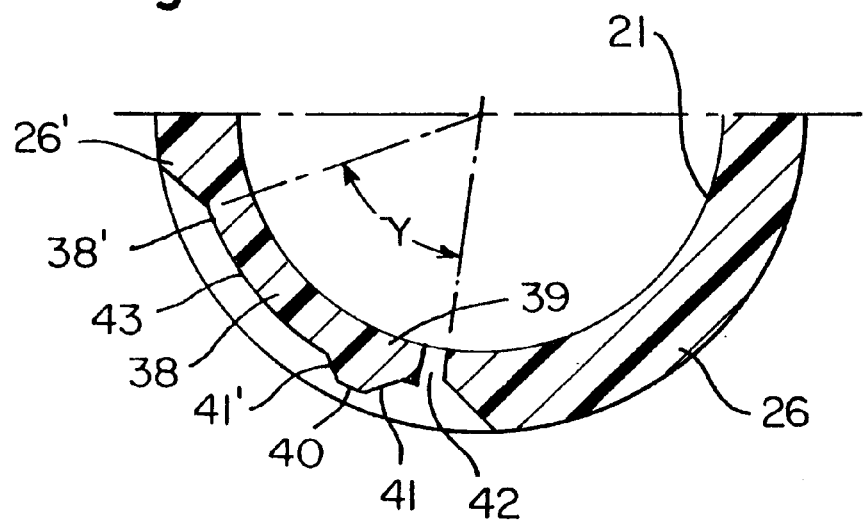
FIG. 5 is a section along the line V—V of FIG. 4.

In FIG. 4 a side view of the closure cap 10 is shown but with the grip portion 28 removed. At the mantle surface of the base body 21 the outer thread 26 is provided that extends over a length of approximately 2.25 complete thread turns (one complete thread turn corresponds to a 360° angular distance) a cutout 37 is provided adjacent to the end 36 of the outer thread 26 facing the annular flange 24 in the subsequently arranged thread turn 26'. In the circumferential direction of the outer thread 26 it extends over an annular distance of approximately 75°. In this cutout 37 a tongue 38 is provided. It extends in the longitudinal direction of the cutout 37 and which is connected integrally with its lower end 38' facing the lower end of the outer thread 26 to the material of the base body 21.

The tongue 38 is springy and has at its free end 39 a radially outwardly oriented projection 40 which has substantially the shape of a triangular or trapezoidal prism. This shape provides slanted surfaces 41 and 41' which in the shown embodiment extend at an angle of approximately 45° to the direction of rotation. This angle, however, may be variable with respect to the desired constructive design. A gap 42 remains between the free end 39 and the base body 21. Between the end 38' and the projection 40 the tongue 38 has an outer contour 43 which matches the diameter $D_i$ of the base body 21 without the thread. The diameter inclusive the outer thread 26 is indicated at $D_a$.

Figure 7:
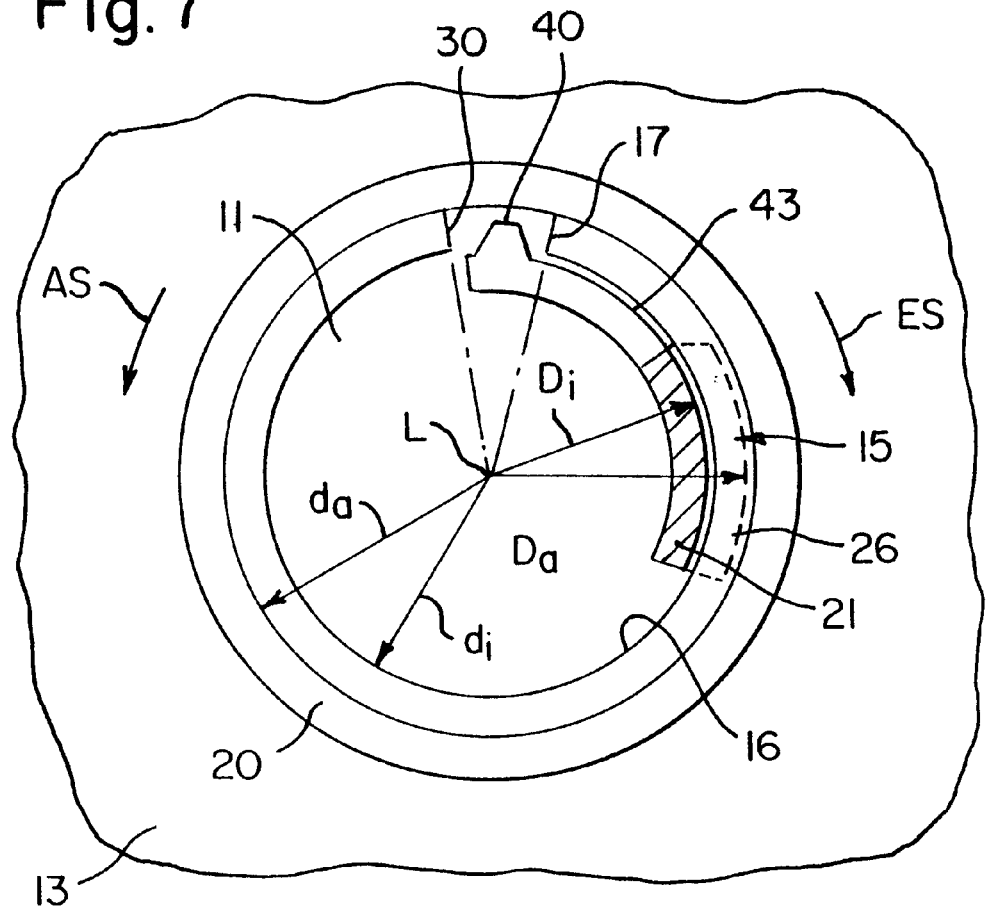
FIG. 7 is a representation according to FIG. 2 with the projection in the catch position.

As shown in FIGS. 2 and 7, the inner thread diameter $d_i$ of the inner thread 15 is between the outer diameter $D_a$ and the inner diameter $D_i$ of the outer thread 26 of the closure cap 10. The inner thread diameter $d_i$ of the inner thread 15 is preferably only slightly greater than the inner diameter $D_i$ of the outer thread 26. This results in a minimal radial play of the closure cap 10 within the fill opening 11. The thread outer diameter $d_a$ of the inner thread 15 is greater than the thread outer diameter $D_a$ of the outer thread 26. The radial outer edge of the projection 40, which serves as a catch, is positioned on a diameter between the inner diameter $d_i$ and the outer diameter $d_a$ of the inner thread 15. It corresponds approximately to the outer diameter $D_a$ of the outer thread 26. The position of the projection 40 in the locked position behind the abutment 30 of the inner thread 15 is shown FIG. 7.

When the closure cap 10 is threaded into the fill opening 11, the outer thread 26 is positioned with minimal radial play at the inner thread 15. The slanted surface 41' of the projection 40 positioned on the springy tongue 38 will come into contact due to its constructive design with the facing end 17 of the thread turn 16 of the inner thread 15. Since the slanted surface 41' is positioned at an angle of approximately 45° to a radial line, the projection 41 will be radially inwardly displaced in an elastic springy fashion when applying a respective torque, whereby due to the different angles of the slant surface 41' and the end face of the end 17 a point contact results. After rotation of the closure cap 10 in the threading (closing) direction ES about approximately 360°, the tongue 38 with the projection 40 springs back radially into the gap 19 so that the slanted surface 41 in the removal direction AS is positioned opposite the abutment 30 at the end 18 of the thread turn 16 of the inner thread 15. In the removal direction AS an advantageous point abutment may result due to the different angles of the surface 41 and of the abutment 30. However, a surface-to-surface abutment may be expedient. Due to the slant of the surface 41 an increased torque is required in the removal direction AS in order move the tongue 38 in the radial direction. The closure cap 10 is thus secured in the fill opening 11 against accidental removal or removal that is too fast, i.e., without allowing pressure relief.

In the position represented in FIG. 7 the closure cap 10 rests with its seal 25 not yet in a sealing fashion on the rim 20 of the fill socket 14. For this purpose the closure cap 10 must be turned in the threading (closing) direction ES about an angle of maximally 120°, preferably 10° to 30°. Due to the pitch of the thread a secure pressing of the seal 25 against the rim 20 takes place. When the closure cap 10, respectively, 10' of the container 9 or 12 is rotated in the removal direction, first a relief of the seal 25 occurs so that excess inner pressure which may be present within the container 9 or 12 is relieved. This takes place upon rotation of the closure cap 10 before the projection 40 contacts the abutment 30. Further rotation in the removal direction AS, as disclosed above, is then possible by applying a greater torque.

Figure 8:
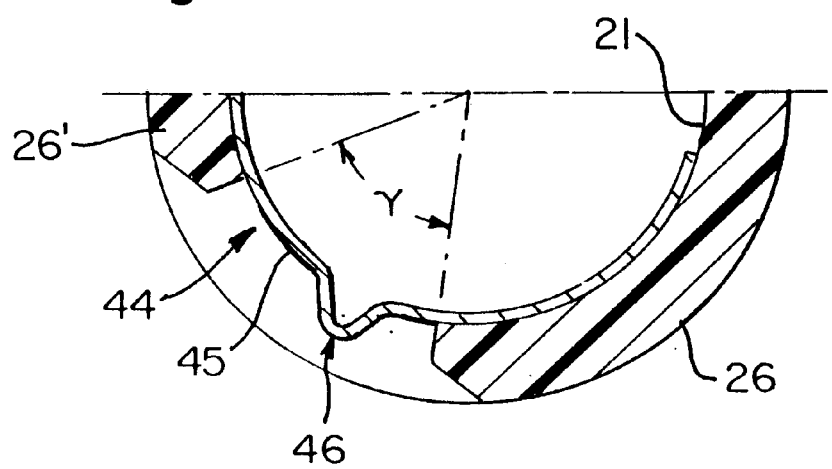
FIG. 8 is a variant of the closure cap of FIG. 5.

As shown in the representation of FIG. 8, the tongue 38' with the projection 40' may be embodied as a member 44 insertable into the base body 21. This member 44 is a springy metal bracket 45 that is clamped within the base body 21. This metal bracket 45 is provided with a convexly curved portion 46 which is a projection for engaging the abutment 30.

The present invention is, of course, in no way restricted to the specific disclosure of the specifications, and drawings, but also encompasses any modifications within the scope of the appended claims.

What we claim is:

1. A closure arrangement for a container, containing an operating fluid of a hand-held working tool driven by a combustion engine, said closure arrangement comprising:
    a closure cap having a cylindrical base body;
    said cylindrical base body having an outer thread;
    said cylindrical base body comprising an annular flange adjacent to said outer thread;
    an annular seal, connected to a first side of said annular flange facing said outer thread;
    a fill socket connected to a container and comprising an inner thread matching said outer thread;
    one of said outer thread and said inner thread comprising a resilient tongue extending in the thread direction of said one of said inner thread and said outer thread and having a radial projection;
    said fill socket having a rim, wherein said seal sealingly rests on said rim, when said closure cap is threaded into said fill socket and positioned in a fully closed position;
    the other one of said inner thread and said outer thread having an abutment, wherein said radial projection, when said closure cap is threaded into the fill socket, is deflected radially and catches radially in a catch position behind said abutment before said fully closed position is reached;
    wherein, when said closure cap is rotated from said fully closed position into said catch position, release of pressure built up in the container occurs to allow safe opening of the container.

2. A closure arrangement according to claim 1, wherein said tongue is positioned at a slant angle matching a pitch angle of said inner thread or said outer thread.

3. A closure arrangement according to claim 1, wherein said tongue and said radial projection are arranged within a path of said outer thread.

4. A closure arrangement according to claim 3, wherein said abutment is formed by a free end of said inner thread.

5. A closure arrangement according to claim 4, wherein said inner thread consists of a single thread turn extending over a circumferential angle of 340° to 350°.

6. A closure arrangement according to claim 1, wherein said tongue has a fixed end connected to said cylindrical body and a free end, wherein said radial projection is connected to said free end.

7. A closure arrangement according to claim 6, wherein said tongue has an angular length of 50° to 75° in said longitudinal direction of said outer thread.

8. A closure arrangement according to claim 6, wherein said fixed end of said tongue is located in a leading position in a closing direction of said closure cap.

9. A closure arrangement according to claim 1, wherein said base body consists of plastic material.

10. A closure arrangement according to claim 9, wherein said tongue with said radial projection is integrally formed together with said base body.

11. A closure arrangement according to claim 9, wherein said tongue with said radial projection is a separate component inserted into said base body.

12. A closure arrangement according to claim 11, wherein said tongue is a metal bracket clamped within said base body.

13. A closure arrangement according to claim 12, wherein said radial projection is radially outwardly convex.

14. A closure arrangement according to claim 9, wherein said projection has a shape of a triangular prism or a trapezoidal prism.

15. A closure arrangement according to claim 1, wherein said catch position and said fully closed position are spaced apart by an angular distance of 120° or less.

16. A closure arrangement according to claim 15, wherein said angular distance is 10° to 30°.

* * * * *